(12) United States Patent  
McCoy et al.

(10) Patent No.: US 6,345,750 B1
(45) Date of Patent: Feb. 12, 2002

(54) ARTICLE CARRIER WITH BICYCLE STABILIZATION BAR

(75) Inventors: Richard W. McCoy, Granger; Katherine A. Adams, Mishawaka, both of IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

(21) Appl. No.: 09/659,148

(22) Filed: Sep. 11, 2000

Related U.S. Application Data

(60) Provisional application No. 60/154,025, filed on Sep. 10, 1999.

(51) Int. Cl.[7] .................................................. B60R 9/10
(52) U.S. Cl. ....................................... 224/525; 224/924
(58) Field of Search ................................. 224/924, 524, 224/525, 526

(56) References Cited

U.S. PATENT DOCUMENTS

| | | | | |
|---|---|---|---|---|
| 3,367,548 A | * | 2/1968 | Cooper | 224/924 |
| 4,815,638 A | * | 3/1989 | Hutyra | 224/924 |
| 5,169,042 A | * | 12/1992 | Ching | 224/524 |
| 5,244,133 A | * | 9/1993 | Abbott et al. | 224/924 |
| 5,662,256 A | * | 9/1997 | Bryan | 224/523 |
| 5,806,738 A | * | 9/1998 | D'Angelo | 224/521 |
| 5,820,004 A | | 10/1998 | Lane | |
| 5,842,615 A | * | 12/1998 | Goodness | 224/509 |
| 5,857,824 A | * | 1/1999 | Aquiar | 224/509 |
| 5,871,131 A | | 2/1999 | Low et al. | |
| 6,006,973 A | * | 12/1999 | Belinky et al. | 224/510 |
| 6,039,227 A | * | 3/2000 | Stark | 224/521 |
| 6,129,371 A | * | 10/2000 | Powell | 224/521 |
| 6,202,909 B1 | * | 3/2001 | Belinky et al. | 224/524 |

* cited by examiner

Primary Examiner—Stephen P. Garbe
(74) Attorney, Agent, or Firm—King & Schickli, PLLC

(57) ABSTRACT

A bicycle and article carrier includes a hitch bar, a support platform carried on the hitch bar, an upright post carried on the hitch bar and a stabilization bar. The stabilization bar is carried on the upright post a spaced distance above the support platform and projects from the post over the support platform. The carrier may also include a fastener for securing the bicycle to be carried in position on the bicycle and article carrier.

8 Claims, 6 Drawing Sheets

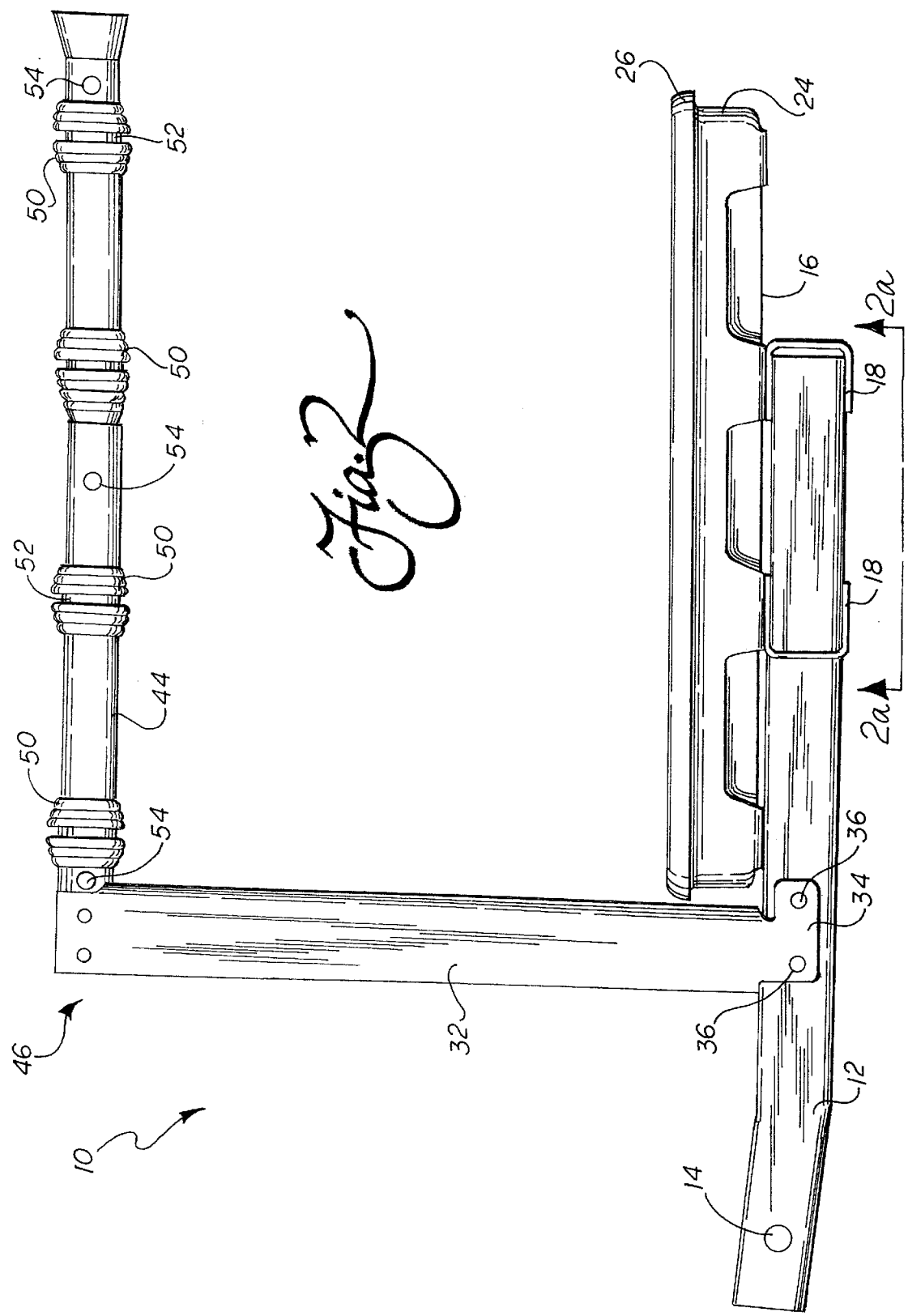

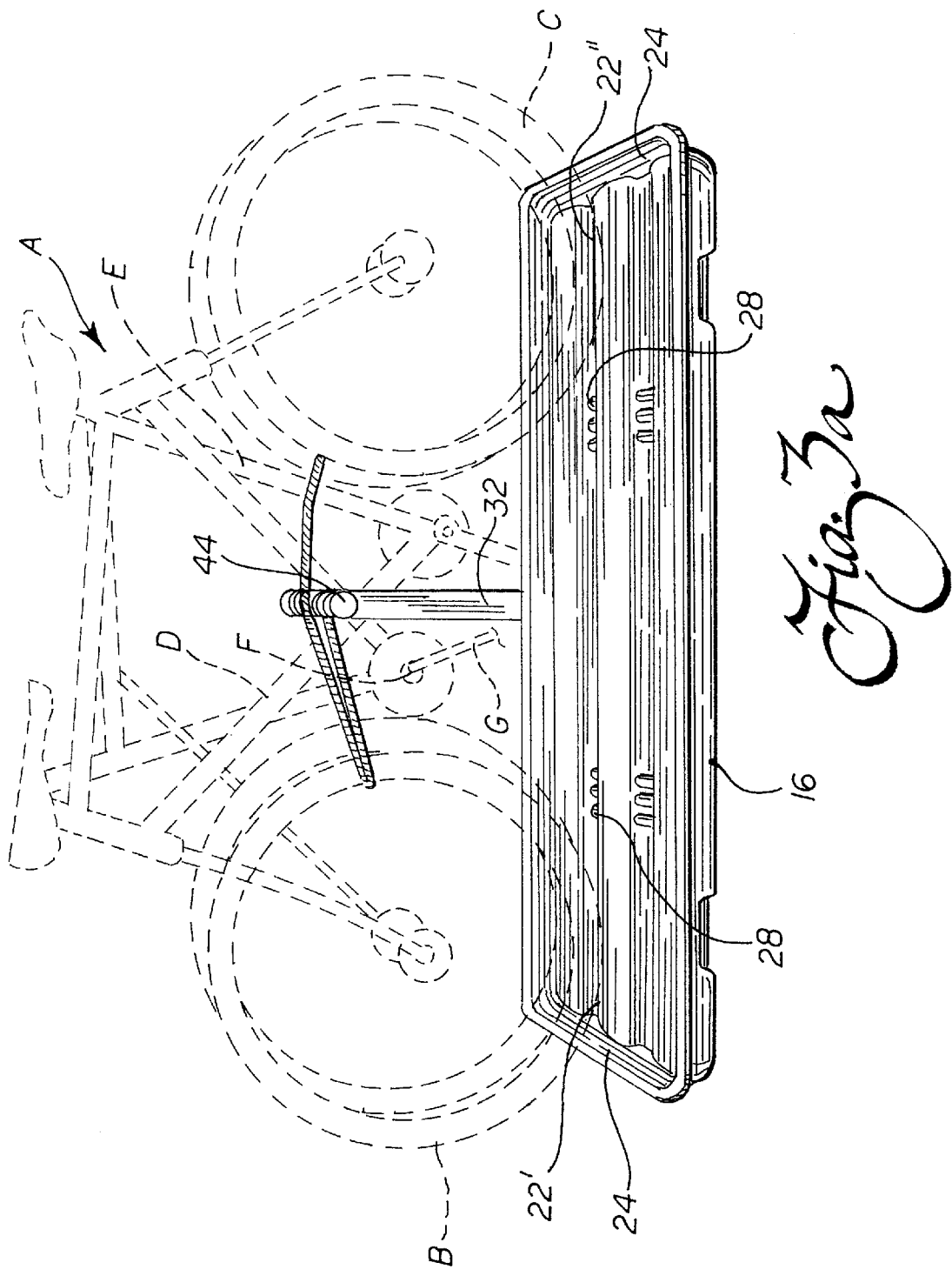

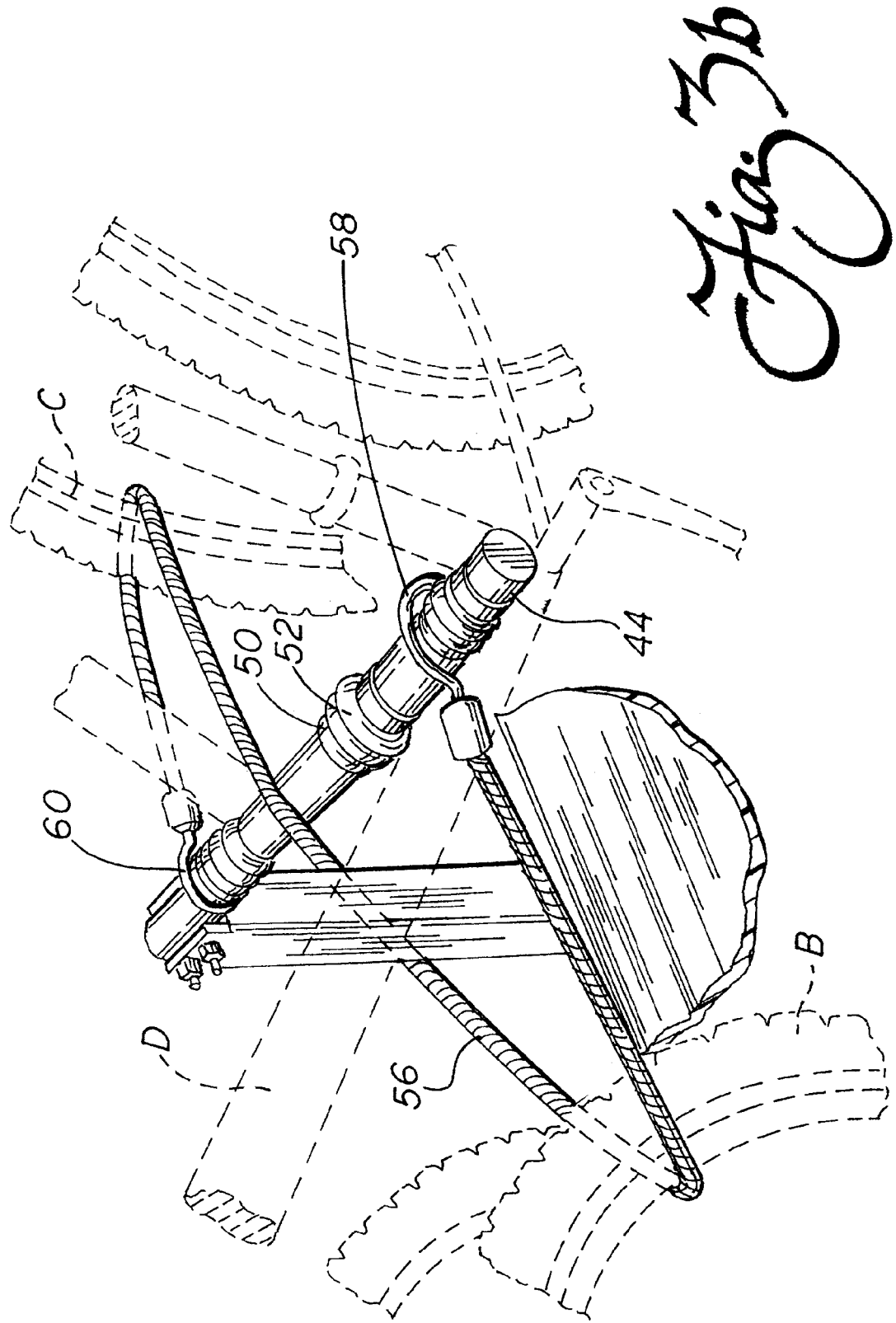

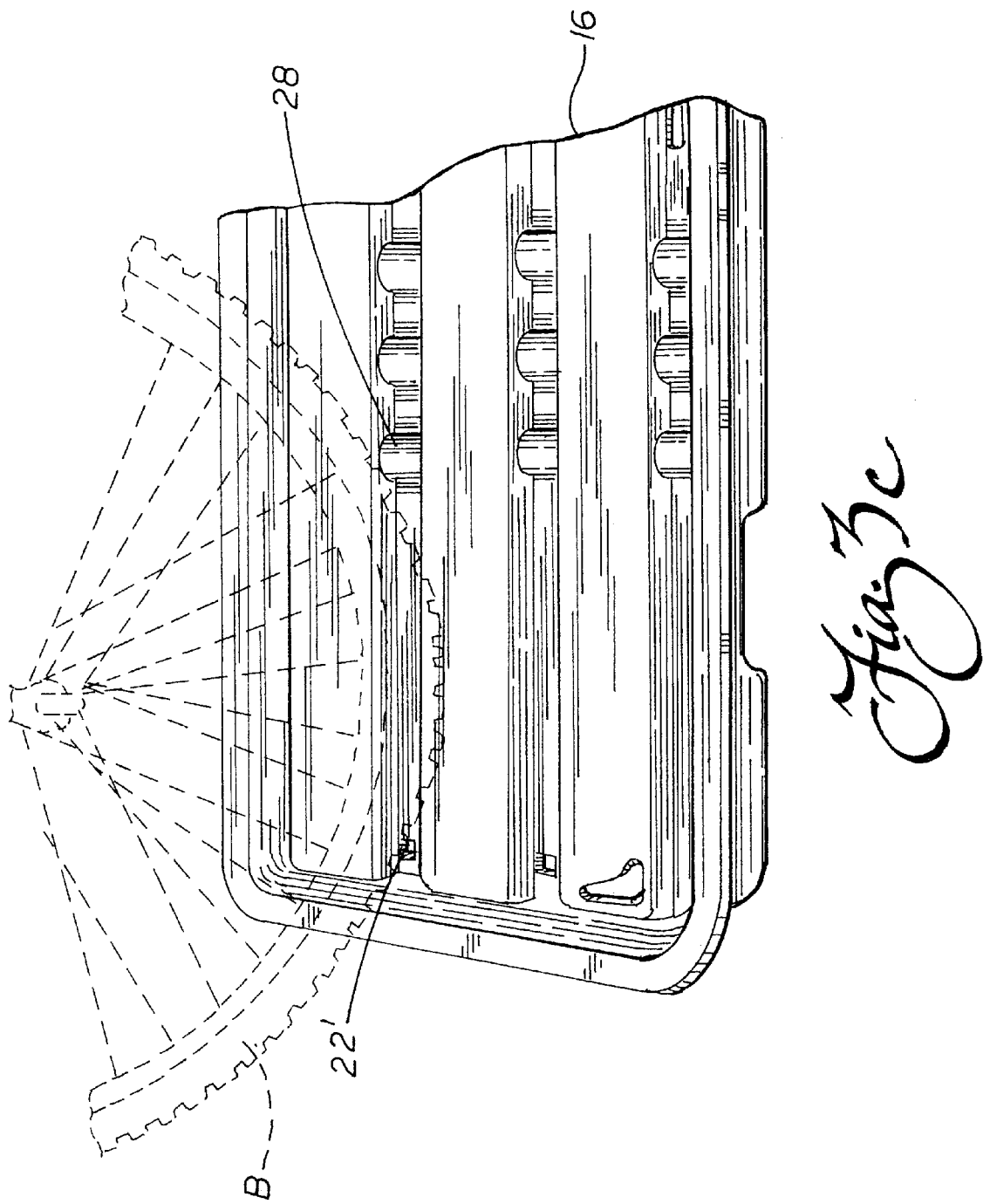

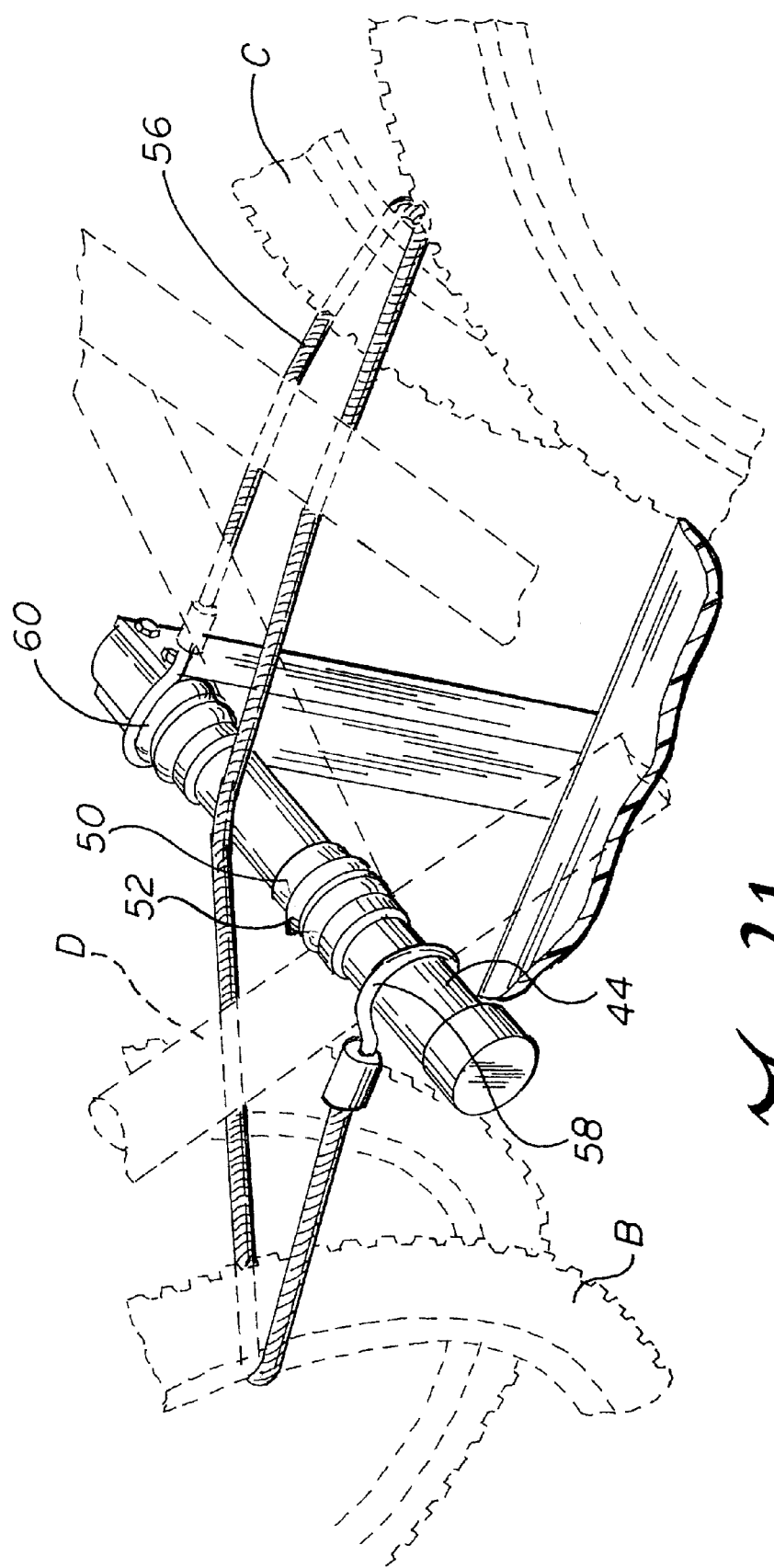

ARTICLE CARRIER WITH BICYCLE STABILIZATION BAR

This application claims the benefit of U.S. Provisional Application No. 60/154,025, filed Sep. 10, 1999.

TECHNICAL FIELD

The present invention relates generally to the towing field and, more particularly, to a combined article carrier and bicycle rack adapted to receive and hold a bicycle of substantially any frame configuration without the use of special adapters or the like.

BACKGROUND OF THE INVENTION

It has long been known to provide bicycle racks that may be attached to a trailer hitch assembly mounted to a towing vehicle. Examples of such bicycle racks include U.S. Pat. No. 5,190,195 to Fullhart et al. and U.S. Pat. No. 5,695,103 to Duvernay et al., both assigned to the assignee of the present invention.

The bicycle rack disclosed in the Fullhart et al. patent is adapted to be detachably mounted to a passenger vehicle via a standard trailer hitch assembly. The bicycle rack has a vertical support that is pivotally connected at one end to a base assembly which is adapted for receipt in a hitch receiver. The other end carries a cross bar assembly with a removably mounted clamp arm for securing a pair of bicycles. The bicycle rack in the Duvernay et al. patent includes a hitch bar for mounting to a standard trailer hitch assembly and a vertical post secured to the hitch bar that carries a storage compartment. The storage compartment includes a cradle for receiving the frame of at least one bicycle.

While useful for their intended purpose, these bicycle racks are only truly adapted for carrying a bicycle incorporating a frame having a top tube that extends in a substantial horizontal plane. Such a top tube is generally found on, for example, traditional men's street racing bicycles. An adaptor must be provided on bicycles incorporating other types of frames if those bicycles are to be carried in the Fullhart et al. and Duvernay et al. bicycle racks. A need is therefor identified for a bicycle carrier of more versatile design that may be utilized to securely carry bicycles of many different frame configurations without the need for special adaptors or the like.

SUMMARY OF THE INVENTION

To achieve the foregoing and other objects, and in accordance with the purposes of the present invention as described herein, a bicycle and article carrier is provided. That bicycle and article carrier may be mounted to a trailer hitch assembly carried on a towing vehicle. The bicycle and article carrier includes a hitch bar as well as a support platform and upright post carried on the hitch bar. A stabilization bar is carried on the upright post. The stabilization bar projects from the upright post a spaced distance above the support platform. A fastener is provided to secure a bicycle/article to the bicycle and article carrier as required.

Still more specifically, the support platform of the bicycle and article carrier further includes at least one channel for receiving a wheel of the bicycle being carried on the carrier. Further, the support platform also preferably includes a raised peripheral edge which closes the outer end of the channel to secure the wheel therein.

The bicycle and article carrier may also include a rubber bumper on the stabilization bar. The rubber bumper engages a portion of the frame of the bicycle being carried on the carrier. The rubber bumper may include a central groove that receives and holds a portion of the frame of the bicycle being carried on the carrier.

In the most preferred embodiment, the fastener is an elastic cord such as a bungee cord including a hook at each end. One end of the elastic cord is secured to the bicycle or the stabilization bar. The elastic cord is then wrapped through the wheels or around the frame of the bicycle on each side of the stabilization bar and the other end of the elastic cord is then secured to the bicycle or stabilization bar with the elastic cord pulled tight to provide a secure connection.

In accordance with yet another aspect of the present invention, a method of carrying a bicycle on a vehicle including a trailer hitch assembly is provided. The method includes the steps of: (1) providing a bicycle carrier with a hitch bar, a support platform and a stabilization bar that projects over the support platform a spaced distance therefrom; (2) positioning the bicycle on the support platform with the stabilization bar received through a frame of the bicycle; and (3) securing the frame of the bicycle to the stabilization bar. The method may be further defined as including the step of inserting at least one wheel of the bicycle in a channel provided in the support platform. Further, the method may include the step of engaging a down tube of the frame of the bicycle against the stabilization bar to provide added support and a more secure connection.

Advantageously, the stabilization bar of the present invention engages the frame of the bicycle along the down tube adjacent or near to the angle formed by the seat tube and down tube. This location is in the vicinity of the hub of the frame which receives the petal assembly for rotation in the frame. This structure is common to almost all bicycle frame configurations and, accordingly, the bicycle rack of the present invention may be used to carry substantially any bicycle design without special adaptors or other modification. This represents a significant advance in the art.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a side elevational view of the bicycle and article carrier shown in FIG. 1;

FIGS. 3a–3c are various views showing the mounting of two bicycles to the carrier of FIG. 1; and FIG. 4 is a detailed rear perspective view showing the mounting of two bicycles to the carrier of FIG. 1 utilizing a single elastic cord to secure both of the bicycles to the stabilization bar.

Figure 1:
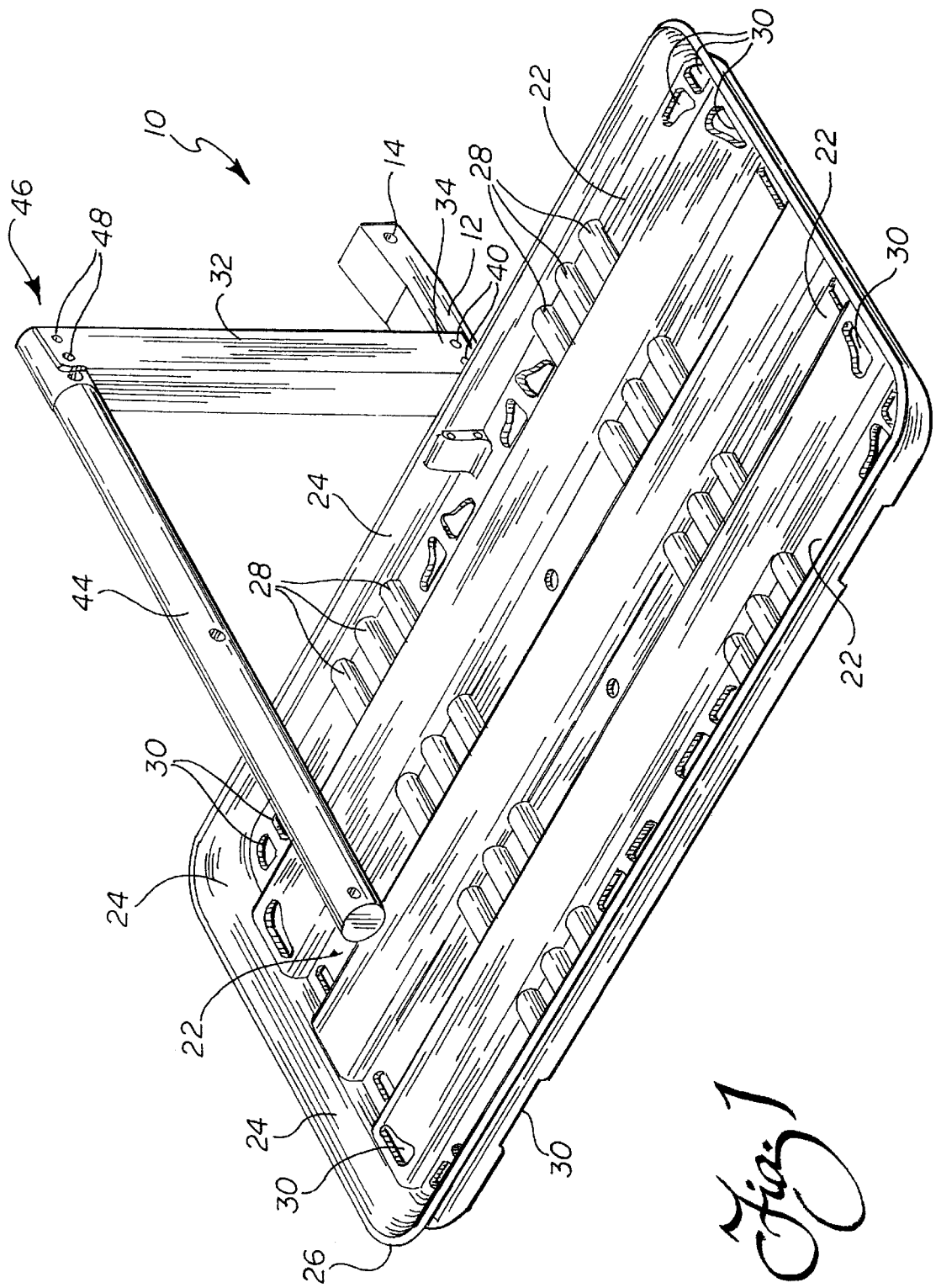
FIG. 1 is a perspective view of the bicycle and article carrier of the present invention.

Reference will now be made in detail to the present preferred embodiment of the invention, an example of which is illustrated in the accompanying drawing.

DETAILED DESCRIPTION OF THE INVENTION

Reference is now made to the drawing figures showing the bicycle and article carrier 10 of the present invention. As shown, the bicycle and article carrier 10 includes a hitch bar 12 which may be formed from a steel torsion tube or other appropriate material. The hitch bar 12 is sized to be received in a hitch receiver of a trailer hitch assembly carried on a towing vehicle (not shown). Such a trailer hitch assembles well known in the art and is, for example, illustrated in U.S. Pat. No. 5,620,198 to Borchers. A connecting pin (not shown) may be used to secure the hitch bar 12 to the trailer hitch assembly. Specifically, the connecting pin is received in apertures 14 in the hitch bar 12 which are aligned with cooperating apertures in opposed sidewalls of the receiver box of the trailer hitch assembly. A support platform 16 is mounted to the hitch bar 12 so as to be carried thereby. Preferably, the support platform 16 is molded from fiberglass reinforced plastic (e.g., compression molded fiberglass filled polypropylene) so as to provide a rigid support and maintain a sharp and clean aesthetic appearance over a long service life. Mounting brackets 18 and cooperating nut and bolt fasteners 20 may be utilized to secure the support platform 16 to the hitch bar 12. Of course, any other appropriate connecting structure could be utilized.

As best shown in FIG. 1, the support platform includes one or more spaced channels 22 (four channels are shown in the preferred embodiment illustrated). The peripheral edges of the support platform 16 are raised providing an upstanding edge wall 24. In the illustrated embodiment, the edge wall 24 has a U shaped upper lip 26 to provide additional strength. As should be appreciated, the edge wall 24 closes the outer ends of the channels 22. A series of ridges 28 in the bottom walls of the channels 22 provide additional strength and partially close or compartmentalize the channels. Thus, it should be appreciated that the channels 22 between the edge wall 24 and the ridges 28 form a cavity or pocket sized and/or shaped to receive the wheel of a bicycle in a manner that will be described in greater detail below.

It should be further appreciated that various apertures 30 are provided around the periphery of the support platform 16. These apertures 30 allow bicycles or other articles of various shapes and sized to be securely tied or strapped to the platform when towing. Further, they also allow water to drain from the platform 16 in inclement weather conditions or when cleaning the platform by hose.

The bicycle and article carrier 10 also includes an upright post 32. The upright post 32 is mounted to the hitch bar 12 at its proximal end by means of an integral mounting yoke 34 that fits over the hitch bar 12. As shown in FIG. 2, the mounting yoke 34 includes a pair of apertures 36 that align with a pair of cooperating apertures in the hitch bar 12. Bolts 40 are positioned in the aligned apertures and lock nuts (not shown) are tightened to the bolts to secure the upright post 32 in position. A stabilization bar 44 is secured to the upright post 32 at the distal end thereof. Specifically, the upper or distal end of the upright post 32 includes a cradle 46 that receives the proximal end of the stabilization bar 44. Cooperating apertures in the cradle 46 and stabilization bar 44 allow the stabilization bar 44 to be secured to the upright post 32 by means of cooperating nut and bolt fasteners 48. As shown in FIGS. 1–3, the stabilization bar 44 projects from the upright post 32 so as to overlie the support platform 16 in plane substantially parallel to the support platform 16 but spaced thereabove a desired distance.

As shown in the FIG. 2 embodiment, the stabilization bar 44 may include one or more rubber bumpers 50 incorporating a central groove 52 provided at spaced locations along the stabilization bar. Additionally, spaced apertures 54 are provided at various positions along the stabilization bar 44. The rubber bumpers 50 and spaced apertures 54 aid in securing a bicycle to the bicycle and article carrier 10 by means of a fastener such as an elastic cord, often referred to in the art as a bungee cord.

More specifically, a bicycle may be secured to the bicycle and article carrier 10 by first positioning the bicycle on the support platform 16 with the stabilization bar 44 received through the frame A of the bicycle (see FIG. 3a–3c). It should also be noted that the front wheel B of the bicycle is received in a first channel pocket 22' defined between the edge wall 24 and the channel ridge 28 at one side of the support platform 16 and the rear wheel C is received in a second channel pocket or cavity 22" defined between the opposite side edge wall 24 and the cooperating channel ridge 28. Advantageously, the channel 22 and the pockets 22', 22" defined therein are sufficiently deep to support the bicycle at rest in the upright position.

When the wheels B, C of the bicycle are properly positioned in the channel 22, it should be appreciated that the down tube D is partially received in and engaged by the central groove 52 of one of the bumpers 50 carried on the stabilization bar 44. The bumper 50 serves not only to protect the paint on the down tube D from damage that might otherwise be caused by contact with the stabilization bar 44 but also dampens any vibration of the bicycle that might otherwise be induced during towing. Once in place, the bumper 50 serves to seat the down tube D in position further supporting and/or stabilizing the bicycle in the upright position. Maximum benefit is achieved since the stabilization bar 44 engages the down tube D near the center of gravity of the bicycle.

As should further be appreciated, a second bicycle may be positioned on the carrier 10 in the same manner as the first but in the next available channel 22 and against the next available bumper 50. While not shown, a third and/or fourth bicycle may also be carried by the present invention.

The final connection between the bicycle and the bicycle and article carrier 10 is completed by using the elastic cord 56. Elastic cord 56 preferably includes a hook 58 at one end and a hook 60 at the other end. Preferably, hook 58 is secured in one of the apertures 54 in the stabilization bar 44 (see FIG. 4). The elastic cord 56 is then pulled taut and wrapped through the spokes of one wheel B of the first bicycle, then back over the top of the stabilization bar 44, then through the spokes of one wheel C of the second bicycle, then back to the stabilization bar 44 where the second hook 60 is secured in a second aperture 54. Advantageously, the tension provided by the elastic cord 56 is sufficient in conjunction with the engagement of the wheels in the channels 22 and the seating of the down tubes D in the bumpers 50 carried on the stabilization bar 44 to secure the bicycles in position on the carrier 10.

Of course, it should be further appreciated that additional elastic cords 56 or other fasteners may be utilized to secure the bicycle or bicycles to the support platform 16 by connecting the hooks thereof to the various apertures 30 in the support platform 16 and threading the cords through and around the frame and wheels of the bicycles. Such additional cords 56 provide extra security to the overall connection and may be particularly desirable when off-road driving over rough and/or bumpy terrain is anticipated.

Advantageously, it should be appreciated from reviewing the drawing figures that the stabilization bar 44 and particularly the bumper 50 carried thereon engage the frame of the bicycle being carried by the carrier 10 along a portion of the down tube D. That portion of the down tube D is near the angle formed by the convergence of the seat tube E and down tube D. This is adjacent the hub F of the bicycle that holds the petal assembly G for rotation in the bicycle frame A. Substantially, any bicycle design includes this structure and, accordingly, the bicycle and article carrier 10 of the present invention may, therefore, be advantageously used to secure substantially any bicycle in position without modification to the carrier or the use of special adaptors or devices. As such, the bicycle and article carrier 10 is convenient to use and sufficiently versatile to meet substantially any users needs. Even if a bicycle of a different design or size is subsequently purchased by the user or must be transported for some reason, the bicycle and article carrier 10 of the present invention may still be utilized to transport that bicycle in an efficient and convenient manner.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A bicycle and article carrier that may be mounted to a trailer hitch assembly carried on a towing vehicle, said bicycle and article carrier, comprising:

a hitch bar;

a support platform carried on said hitch bar;

an upright post carried on said hitch bar;

a stabilization bar carried on said upright post a spaced distance above said support platform, said stabilization bar projecting from said upright post over said support platform and including spaced openings; and an elastic cord having a hook at each end, each hook being sized for receipt in one of said spaced openings to secure a bicycle/article to said bicycle and article carrier.

2. The bicycle and article carrier of claim 1, wherein said support platform further includes at least one channel for receiving a wheel of said bicycle being carried on said carrier.

3. The bicycle and article carrier of claim 2, wherein said support platform includes a raised peripheral edge.

4. The bicycle and article carrier of claim 2, further including a rubber bumper on said stabilization bar for engaging a portion of a frame of said bicycle being carried on said carrier.

5. The bicycle and article carrier of claim 4, wherein said rubber bumper includes a central groove that receives and holds said portion of said frame of said bicycle being carried by said carrier.

6. The bicycle and article carrier of claim 1, further including a rubber bumper on said stabilization bar for engaging a portion of a frame of said bicycle being carried on said carrier.

7. A method of carrying a bicycle on a vehicle including a trailer hitch assembly comprising:

providing a bicycle carrier with a hitch bar, a support platform and a stabilization bar that projects over said support platform a spaced distance therefrom;

positioning said bicycle on said support platform with said stabilization bar received through a frame of said bicycle;

engaging a down tube of said frame of said bicycle against said stabilization bar, securing the frame of said bicycle to said stabilization bar.

8. The method of claim 7, including inserting at least one wheel of said bicycle into a channel provided in said support platform.

* * * * *